United States Patent

Schwegler et al.

[11] Patent Number: 5,975,115
[45] Date of Patent: Nov. 2, 1999

[54] PRESSURE CONTROL VALVE

[75] Inventors: Helmut Schwegler, Pleidelsheim; Kurt Herbst, Burgstetten; Roland Hoepft, Kempten; Ludwig Baechle, Ofterschwang; Thomas Gregorius, Grossbottwar, all of Germany

[73] Assignee: Robert Bosch GmbH, Stuttgart, Germany

[21] Appl. No.: 09/066,456

[22] PCT Filed: Aug. 25, 1997

[86] PCT No.: PCT/DE97/01848

§ 371 Date: Apr. 30, 1998

§ 102(e) Date: Apr. 30, 1998

[87] PCT Pub. No.: WO98/09071

PCT Pub. Date: Mar. 5, 1998

[30] Foreign Application Priority Data

Aug. 31, 1996 [DE] Germany ............................ 196 35 439

[51] Int. Cl.$^6$ ............................ F02M 69/54; G05D 16/06
[52] U.S. Cl. ............................................. 137/315; 137/510
[58] Field of Search ................................... 137/315, 510; 123/447, 459, 463

[56] References Cited

U.S. PATENT DOCUMENTS

| | | | |
|---|---|---|---|
| 5,076,320 | 12/1991 | Robinson | 137/510 |
| 5,105,787 | 4/1992 | Imoehl | 123/469 |
| 5,226,392 | 7/1993 | Breuer et al. | 123/457 |
| 5,609,138 | 3/1997 | Mutschler | 137/510 X |

FOREIGN PATENT DOCUMENTS 195 08 637  9/1996  Germany .

*Primary Examiner*—Stephen M. Hepperle
*Attorney, Agent, or Firm*—Edwin E. Greigg; Ronald E. Greigg

[57] ABSTRACT

Known pressure regulator valves for motor vehicles are comprised of a relatively large number of individual parts that have to be assembled at a high cost. In the pressure regulator valve set forth, the stop piece and the housing part are injection molded. This reduces assembly costs in the manufacture of the pressure regulator valve. The pressure regulator valve is particularly suited for fuel delivery systems of motor vehicles with an internal combustion engine.

18 Claims, 8 Drawing Sheets

PRESSURE CONTROL VALVE

PRIOR ART

The invention is based on a pressure regulator valve.

A pressure regulator valve that is currently mass produced and widely distributed contains a large number of different individual components which are preassembled into subassemblies, which are then connected to one another chiefly by crimping. One of the subassemblies contains, for example, a membrane and a closing body. The closing body contains, for example, a ball part, a securing element, a spring plate, and a spring. These parts are assembled and caulked. Another subassembly includes a housing part into which a metal nozzle is press fitted. The housing part is comprised of stamped sheet metal with a central opening, wherein the sheet metal is bent over in the region of the central opening. The metal nozzle is press fitted into this central opening. The housing part that holds the metal nozzle is connected by crimping to another housing part that constitutes a top piece. The membrane with the closing body is inserted between the two housing parts before they are connected.

An additional support ring, a sealing element, and a support disk are also mounted to the housing part that holds the metal nozzle. The sealing element is an O-ring between the support ring and the support disk.

In the known pressure regulator valve, the large number of individual parts to be connected to one another by means of assembly is disadvantageous. As a result, a considerable expenditure is necessary in the assembly. Attention must also be paid that the individual parts are reliably connected to one another and are not damaged during assembly.

Since the pressure regulator valve is often required, small savings in the individual pressure regulator valve also result in a large savings, considered as a whole, in the cost for the manufacture of the pressure regulator valve.

ADVANTAGES OF THE INVENTION

The pressure regulator valve according to the invention has the advantage over the prior art that the number of individual parts to be assembled during the assembly of the pressure regulator valve is reduced. As a result, the assembly steps during assembly of the pressure regulator valve can be reduced. This simplifies the assembly significantly and the danger of assembly errors and function interruptions caused by them is considerably reduced.

Advantageous improvements and updates of the pressure regulator valve disclosed are possible by means of the measures taken herein after.

If the fuel return is routed through the injection molded stop piece, then as a result, the number of required components is advantageously reduced and the connection can be eliminated between the housing part and the metal nozzle through which the fuel return is routed in the known pressure regulator valve, which connection is costly to produce and is critical with regard to the known pressure regulator valve.

The valve seat can be provided in a simple manner on the injection molded stop piece. In an advantageously trouble free manner, a material can be used for the injection molded stop piece, which is well suited for the formation of a valve seat.

The housing part of the valve housing can be embodied without a noticeable increase in cost so that the valve seat toward which the closing body is acted upon is formed on the housing part. As a result, the number of individual parts to be assembled is advantageously reduced and from the material, the housing part advantageously has favorable properties that lend it the capacity to be used as a valve seat. It is advantageously possible to mechanically machine the valve seat on the housing part in a trouble free manner.

The injection molded stop piece can be embodied very simply so that the stop piece can be used to produce a seal between the fuel inlet and the fuel return. The seal can also be produced by means of an additional sealing element that is inexpensive to produce, preferably an O-ring. However, the seal can also be produced with the aid of a seal formed directly onto the stop piece. This advantageously further reduces the number of individual parts to be assembled.

The injection molded stop piece can advantageously be used to produce a seal between the fuel delivery system and the environment surrounding the pressure regulator valve. A sealing element, preferably an O-ring held on the pressure regulator valve, can be provided between the stop piece and the fuel delivery system. The stop piece, though, can also be advantageously embodied so that a separate sealing element can be eliminated. This can advantageously take place without cost by means of a seal formed onto the stop piece.

If the injection molded stop piece is embodied so that it is joined together as one piece, then the cost for the injection molding manufacture of the stop piece is advantageously reduced significantly.

Through the injection molding manufacture and connection of the closing body to the membrane, the individual parts to be put together in assembly fashion are advantageously further reduced markedly.

If the closing body is comprised at least in part of plastic, then the manufacturing expenditure for the pressure regulator valve is reduced, which signifies advantageously lower manufacturing costs.

BRIEF DESCRIPTION OF THE DRAWINGS

Preferably selected, particularly advantageous exemplary embodiments of the invention are represented in simplified form in the drawings and will be explained in more detail in the description that follows.

DESCRIPTION OF THE EXEMPLARY EMBODIMENTS

The pressure regulator valve embodied according to the invention is used for regulating a pressure of a fuel in a fuel delivery system. The pressure regulator valve can preferably be used in internal combustion engines in which a pressure of the fuel should be regulated in the fuel delivery system. The pressure regulator valve is installed in a suitable location at an installation point provided in the fuel delivery system. The installation point, for example, is an opening in a fuel distributing tube belonging to the fuel delivery system or, for example, an opening in a housing of a fuel pump of the fuel delivery system. By means of the fuel delivery system, fuel travels via a pressure line to the installation point that receives the pressure regulator valve and a fuel return line conveys excess fuel from the installation point back to a fuel tank. The pressure regulator valve serves to regulate the pressure in the pressure line.

Figure 1:
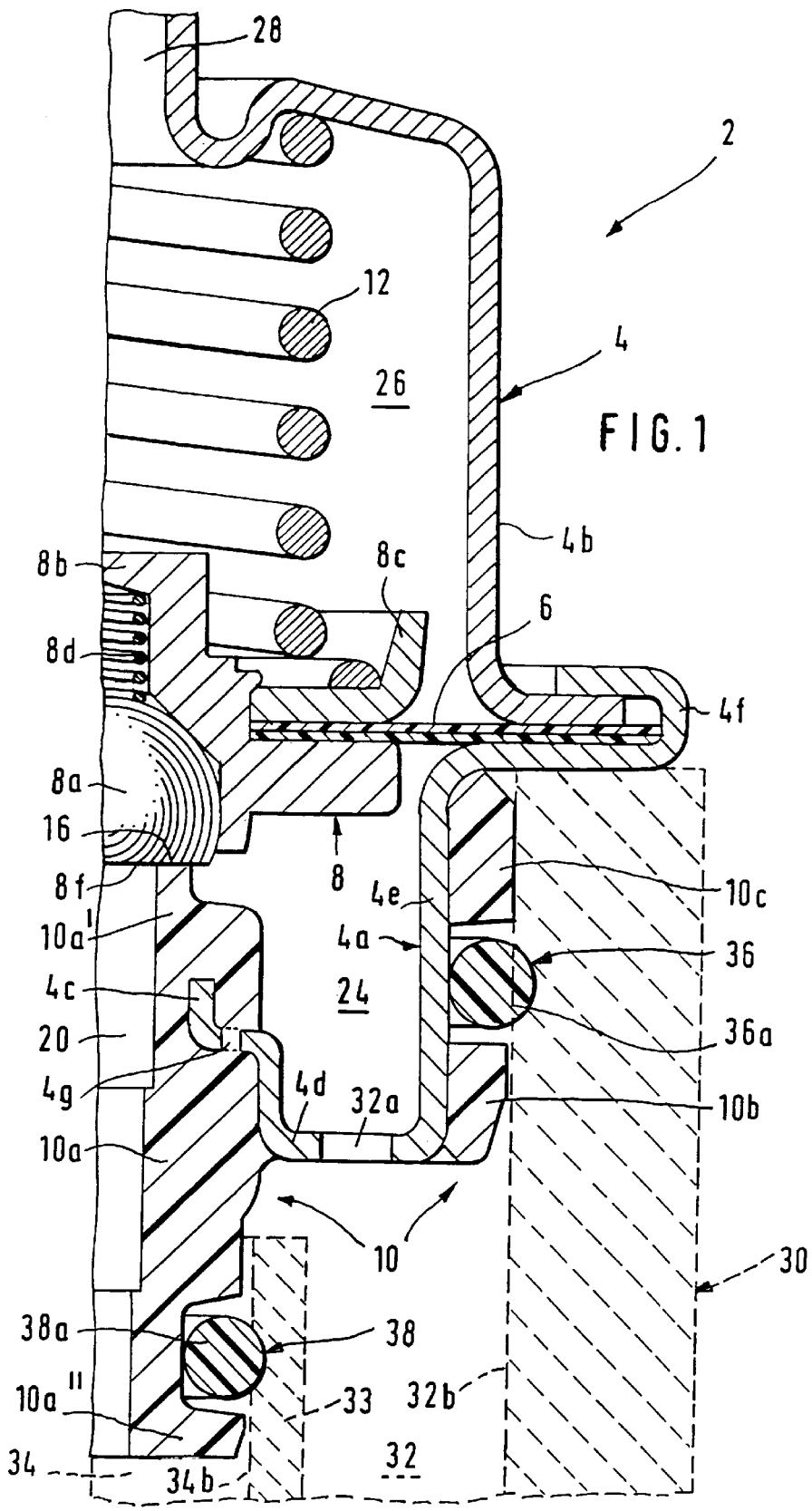
FIGS. 1 to 10 show partial cross-sectional views of differently embodied exemplary embodiments.

In a first exemplary embodiment, FIG. 1 shows a half section along a symmetry axis through a particularly advantageous pressure regulator valve 2 that is embodied by way of example and is preferably selected for the description.

The pressure regulator valve 2 that has been selected by way of example has an essentially rotationally symmetrical form. In order to be able to represent the details in as large a form as possible without taking up too much space, the intersecting plane, which is selected for the drawing and passes through the pressure regulator valve 2, is only depicted on one side of the symmetry axis.

The pressure regulator valve 2 includes a valve housing 4, a membrane 6, a closing body 8, a stop piece 10, and a closing spring 12. In the exemplary embodiment preferably selected for the current description, the valve housing 4 is composed of two housing parts 4a and 4b. The housing part 4a that is shown on the bottom in the drawing will be referred to below as the lower housing part 4a. Correspondingly, the housing part 4b will be referred to below as the upper housing part 4b. Since the installation position of the pressure regulator valve 2 is arbitrary, the housing part 4a referred to as the lower housing part 4a can also be disposed above the so-called upper housing part 4b when installed. The membrane 6 is clamped along its circumference in a sealed fashion between the lower housing part 4a and the upper housing part 4b.

The closing body 8 includes, for example, a flattened ball part 8a, a securing element 8b, a spring plate 8c, and a spring 8d. The membrane 6 has a central recess and on the circumference of this recess, is clamped in a sealed fashion in the closing body 8 between the securing element 8b and the spring plate 8c. There is a flat face 8f on the ball part 8a.

In the exemplary embodiment preferably selected for FIG. 1, the stop piece 10 includes a first region 10a injection molded onto the lower housing part 4a of the valve housing 4, a second region 10b injection molded onto the lower housing part 4a, and a third region 10c injection molded onto the lower housing part 4a. The first region 10a will be referred to below as the nozzle 10a. The second region 10b will be referred to below as the support disk 10b, and the third region 10c will be called the support ring 10c. For the sake of being able to make the present description as clear as possible, these terms for the different regions of the stop piece 10 will also be maintained in the other exemplary embodiments represented in the other Figs., although in some of the exemplary embodiments, the transitions between the regions 10a, 10b, and 10c are fluid and in some of the selected exemplary embodiments, sharp differentiations cannot be made between the nozzle 10a, the support disk 10b, and the support ring 10c.

The injection molded nozzle 10a of the stop piece 10 has an inner side 10a', which is oriented toward the closing body 8 and on which a valve seat 16 is disposed, and the nozzle 10a has an outer side 10a" oriented away from the closing body 8. A connecting opening, which is embodied as stepped, passes through the nozzle 10a. The connecting opening has been produced by means of the corresponding shaping of the injection molded form used for the injection molding or casting of the nozzle 10a. The connecting opening, though, can also be bored. The connecting opening is used as a fuel return 20. The fuel return 20 leads from the inner side 10a' to the outer side 10a", i.e. from the valve seat 16 to a fuel return line 34.

The membrane 6 divides a fuel chamber 24 from a valve chamber 26. By way of a connection, the valve chamber 26 communicates via a line, not shown, for example with an intake tube, not shown, that belongs to the internal combustion engine, not shown.

The pressure regulator valve 2 is part of a fuel delivery system 30. Only a partial region of the fuel delivery system 30 is represented in the drawings. The partial region of the fuel delivery system 30 shown is reproduced with dashed lines in a part of the drawings for the sake of improved clarity. There is a bore that acts as a pressure line 32 in the fuel delivery system 30. The bore of the pressure line 32 has a diameter 32b. A sleeve extension 33 in the bore of the pressure line 32 of the fuel delivery system 30 constitutes the beginning of the fuel return line 34. In other words, the reference numeral 33 indicates a return fitting. The sleeve extension 33 of the fuel return line 34 has an inner diameter 34b. An electrically driven fuel pump, not shown, delivers fuel from a fuel tank, not shown, into the pressure line 32. Fuel not needed by the engine flows from the pressure line 32 through the pressure regulator valve 2 to the fuel return line 34 and from there back to the fuel tank.

The lower housing part 4a is preferably a shaped sheet metal part stamped out of a piece of sheet metal, which has been shaped by stamping and molding. The housing part 4a can consequently be referred to as a deep-drawing bowl. The housing part 4a, though, can also, for example, be a turned part produced by cutting machining work. The lower housing part 4a provided with a preferably selected shape that is shown by way of example in FIG. 1 can be conceptually divided into different regions. The lower housing part 4a has, for example, an inner region 4c, a radially extending intermediary region 4d, a cylindrically or slightly conically extending intermediary region 4e, and an outer region 4f.

The outer region 4f is beaded. The two housing parts 4a and 4b are connected to each other by means of the crimping thus produced and the membrane 6 is clamped on its outer circumference between the two housing parts 4a and 4b. The outer region 4f also serves to spatially fix the pressure regulator valve 2 axially in relation to the fuel delivery system 30.

FIG. 1 shows an opening that leads through the intermediary region 4d of the valve housing 4. The opening serves as a fuel inlet 32a. The fuel inlet 32a connects the pressure line 32 of the fuel delivery system 30 to the fuel chamber 24.

The closing spring 12 and/or a pressure in the valve chamber 26 acts on the face 8f, which is provided on the closing body 8, in the direction of the valve seat 16. If the pressure of the fuel in the pressure line 32, i.e. the pressure of the fuel in the fuel chamber 24, lies below a particular value, then the ball part 8a rests against the valve seat 16 and there is no connection for the fuel from the fuel chamber 24 to the fuel return 20. If the pressure of the fuel in the fuel chamber 24 is greater than a particular value, then the closing body 8 lifts up from the valve seat 16 and the fuel can flow out of the pressure line 32 of the fuel delivery system 30, through the fuel inlet 32a, through the fuel chamber 24, through the gap between the closing body 8 and the valve seat 16, through the fuel return 20, and into the fuel return line 34 of the fuel delivery system 30.

The support disk 10b and the support ring 10c of the stop piece 10 are injection molded onto the lower housing part 4a in the intermediary region 4e and as a result of this injection molding, are connected to the lower housing part 4a in a simple manner. The support disk 10b has a bevel on its outer circumference, which serves to facilitate the insertion of the pressure regulator valve 2 into the diameter 32b of the pressure line 32 of the fuel delivery system 30. The support disk 10b and the support ring 10c are used to spatially fix the pressure regulator valve 2 in relation to the fuel delivery system 30 and after the installation of the pressure regulator valve 2 in the fuel delivery system 30, radially secure the pressure regulator valve 2 in the position provided.

A housing sealing point 36 is provided that produces a seal between the valve housing 4 and the fuel delivery system 30 in order to seal the pressure line 32 in relation to the environment. The housing sealing point 36 provides for the fact that no fuel can escape from the pressure line 32 into the environment. In the exemplary embodiment shown in FIG. 1, the housing sealing point 36 includes an inserted sealing element 36a. The sealing element 36a is preferably an O-ring inserted into a circumferential groove provided between the injection molded support disk 10b and the injection molded support ring 10c. If the pressure regulator valve 2 is mounted in the fuel delivery system 30, then the sealing element 36a presses radially outward against the diameter 32b of the pressure line 32 into which the lower housing part 4a of the pressure regulator valve 2 is installed.

A sealing point 38 is provided in order to produce a seal between the valve housing 4 and the fuel delivery system 30. The sealing point 38 prevents an undesired flow or leakage of fuel from the pressure line 32 into the fuel return line 34. In other words, the sealing point 38 is used to produce a seal between the fuel inlet and the fuel return. In the exemplary embodiment shown, the sealing point 38 contains a sealing element 38a, wherein the sealing element 38a is an O-ring that is inserted into a groove provided on the outer circumference of the nozzle 10a. The sealing element 38a is elastic and presses in the radial direction against the groove on the nozzle 10a and against the diameter 34b of the sleeve extension 33.

As shown in the longitudinal section through the pressure regulator valve 2, the lower housing part 4a is bent several times in the vicinity of the inner region 4c. The nozzle 10a is comprised of a rigid plastic or rubber or another material that can be injection molded or cast, and is injection molded against the inner region 4c of the lower housing part 4a of the valve housing 4. The multiple bending of the inner region 4c produces a strong connection between the injection molded nozzle 10a and the housing part 4a and this connection supports the hold between the nozzle 10a and the lower housing part 4a. So that the injection molded nozzle 10a is connected to the housing part 4a in a particularly stable manner and to facilitate the injection molding of the nozzle 10a, a bore 4g is provided in the inner region 4c of the housing part 4a. Depending on the shape of the housing part 4a, the bore 4g can also be eliminated. A number of bores 4g can also be provided.

Preferably the same material is used for the support disk 10b and the support ring 10c as is used for the nozzle 10a. In other words, the entire stop piece 10 is comprised of a material that can be injection molded or cast.

Even if the nozzle 10, the support disk 10b, and the support ring 10c are connected to the housing part 4a separately from one another, as shown by way of example in FIG. 1, the tool for injection molding these parts can nevertheless be shaped so that the nozzle 10a, the support disk 10b, and the support ring 10c are produced together in a joint injection molding procedure.

Figure 2:
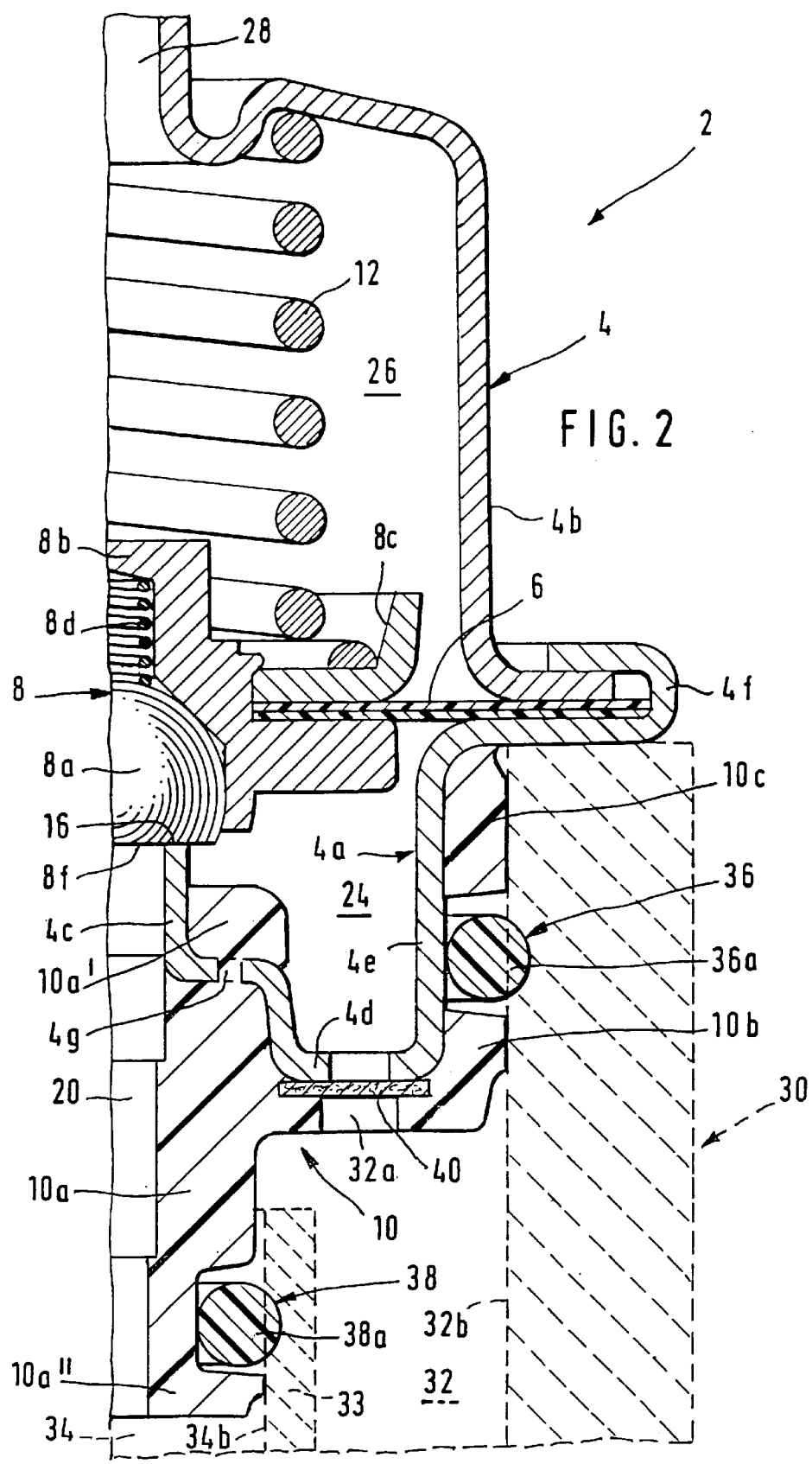

FIG. 2 shows another selected, particularly advantageous exemplary embodiment.

In all of the Figs., parts that are the same or have the same function are provided with the same reference numerals. Provided that nothing to the contrary is mentioned or represented in the drawings, what is mentioned and represented in conjunction with one of the Figs. also applies to the other exemplary embodiments. As long as the explanations do not say otherwise, the details of the different exemplary embodiments can be combined with one another.

In the exemplary embodiment shown in FIG. 2, the nozzle 10a of the stop piece 10 extends along the intermediary region 4d until the support disk 10b of the stop piece 10. The nozzle 10a and the support disk 10b are directly connected materially.

The fuel inlet 32a leads from the pressure line 32 through the stop piece 10 and through the lower housing part 4a into the fuel chamber 24. In the course of the fuel inlet 32a, a filter 40 is provided at the point at which the injection molded stop piece 10 rests against the housing part 4a. The filter 40 is injection molded into the stop piece 10. The filter 40 prevents dirt particles from penetrating into the fuel chamber 24. The filter 40 can be inserted into the casting form provided for the injection molding of the stop piece 10 onto the housing part 4a, before the stop piece 10 is injection molded. After the stop piece 10 is injection molded onto the housing part 4a, the filter 40 is connected to the housing part 4a in captive fashion. As a result, the filter 40 advantageously does not bring about any additional assembly costs in a subsequent assembly of the pressure regulator valve 2.

In the exemplary embodiment shown in FIG. 2, the inner region 4c of the housing part 4a is extended in the axial direction beyond the inner side 10a' of the nozzle 10a in the direction toward the closing body 8. The valve seat 16 is formed on the end face of the inner region 4c of the housing part 4a oriented toward the closing body 8. If the pressure in the fuel chamber 24 lies below a particular value, then the closing body 8 rests with the ball part 8a against the valve seat 16 provided on the housing part 4a. Because in the preferred embodiment of the pressure regulator valve 2, as has already been mentioned, the housing part 4a is a shaped sheet metal part, the valve seat 16 is consequently disposed directly on the sheet metal part that constitutes the valve housing 4.

Starting from the valve seat 16, the fuel return 20 first extends inside the inner region 4c of the housing part 4a and then extends through the nozzle 10a until reaching the outer side 10a".

Figure 3:
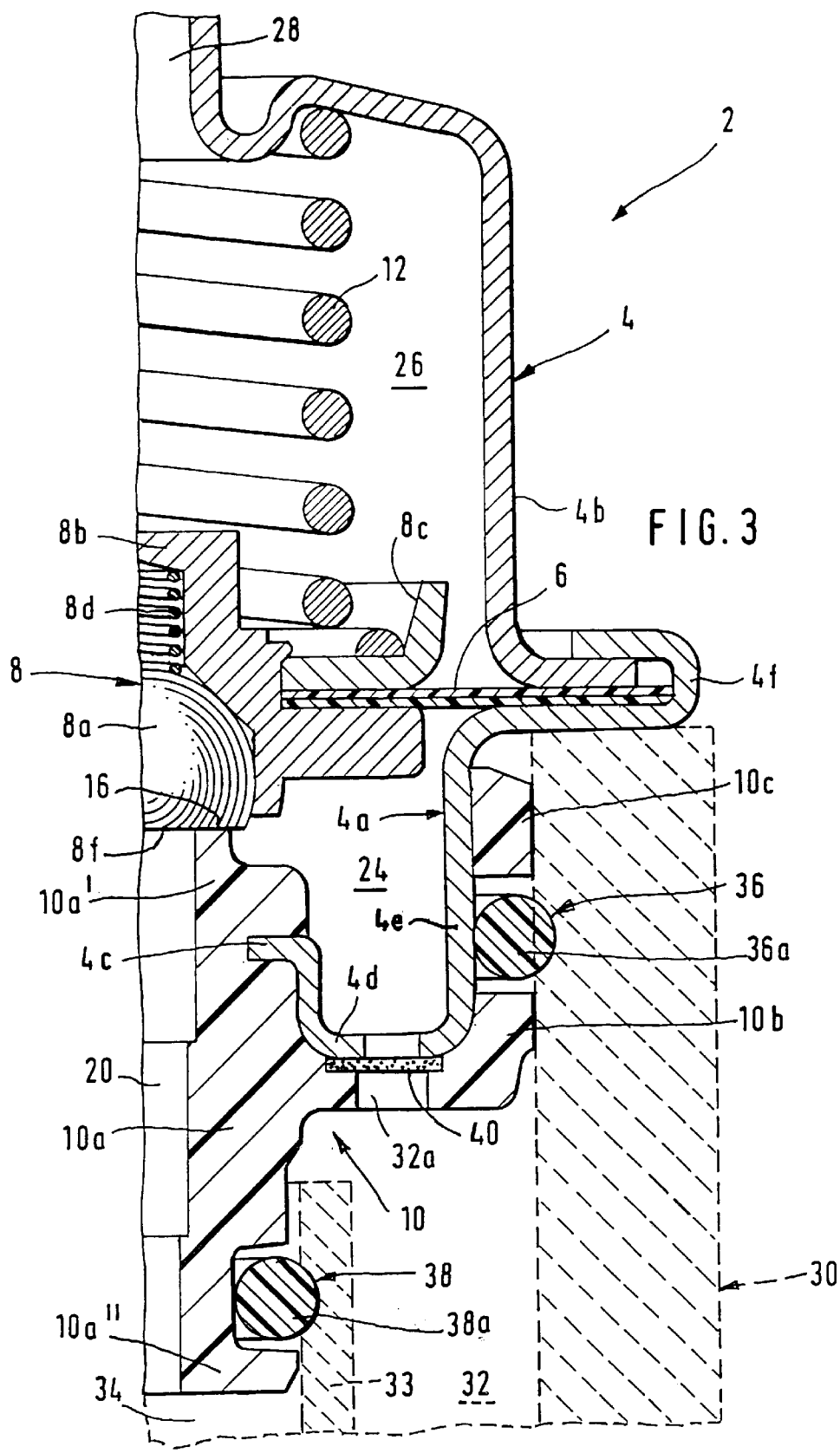

FIG. 3 shows another preferably selected exemplary embodiment.

In contrast to the exemplary embodiment shown in FIG. 2, the valve seat 16 is not disposed directly on the material of the housing part 4a, but rather the valve seat 16 is disposed on the inner side 10a' of the nozzle 10a oriented toward the closing body 8 and the nozzle is injection molded onto the housing part 4a. The valve seat 16 is affixed to the valve housing 4 by way of the nozzle 10a of the stop piece 10.

Figure 4:
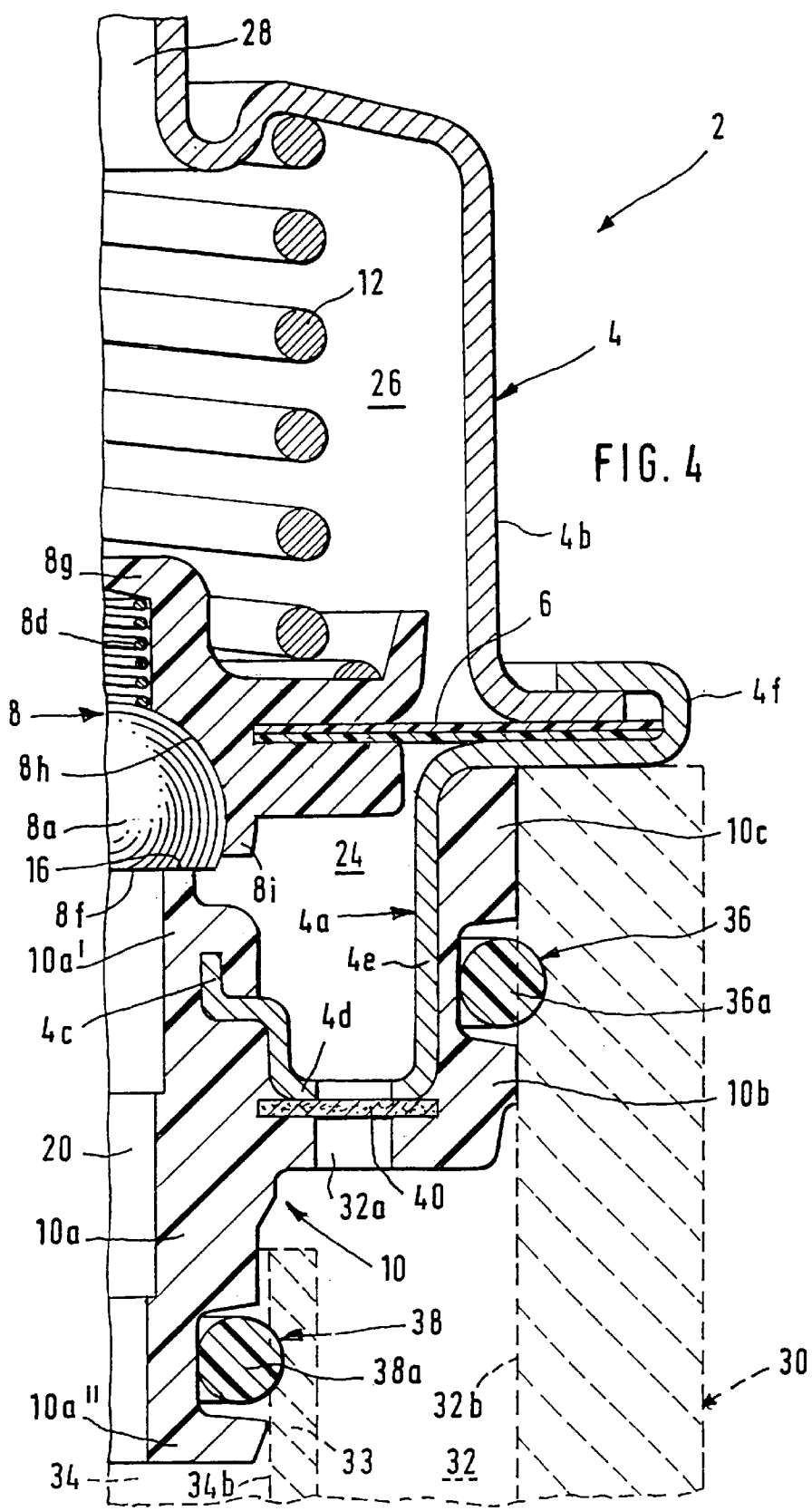

FIG. 4 shows another preferably selected exemplary embodiment.

In the exemplary embodiment shown in FIG. 4, the support disk 10b and the support ring 10c are directly connected to each other materially. The support disk 10b and the support ring 10c transition directly into each other when viewed from the groove for the sealing element 36a. In contrast to this, the support disk 10b and the support ring 10c in FIG. 1 are injection molded onto the housing part 4a, materially separated from each other. Also in FIG. 1, the injection molding of the support disk 10b and the support ring 10c can occur together with the nozzle 10a at the same time in a common injection molding procedure. The exemplary embodiment according to FIG. 1 has the advantage that the required installation space for the pressure regulator valve 2 can be smaller and, depending on the process for manufacturing the stop piece 10, the exemplary embodiment according to FIG. 4 offers advantages in the injection molding of the stop piece 10 onto the housing part 4a.

In the exemplary embodiment shown in FIG. 4, the closing body 8 is essentially comprised of the ball part 8a, the spring 8d, and a shaped part 8g.

The shaped part 8g is comprised of cast or injection molded plastic. The same base material can be used for the shaped part 8g and for the stop piece 10. The membrane 6 is inserted into the form for manufacturing the shaped part 8g before the injection molding or casting of the shaped part 8g. As a result, the inner circumference of the membrane 6 is affixed to the closing body 8 in a sealed fashion.

The-shaped part 8g has a spherically shaped ball receptacle 8h. On the side of the shaped part 8g oriented toward the fuel chamber 24, a rim 8i encloses the ball receptacle 8h. More than half of the ball part 8a is disposed in the ball receptacle 8h, in other words, the inner diameter of the rim 8i is smaller than the diameter of the ball part 8a so that the ball part 8a is held by the rim 8i. To that end, the rim 8i is bent slightly inward by means of hot forming, for example after the installation of the ball part 8a.

Figure 5:
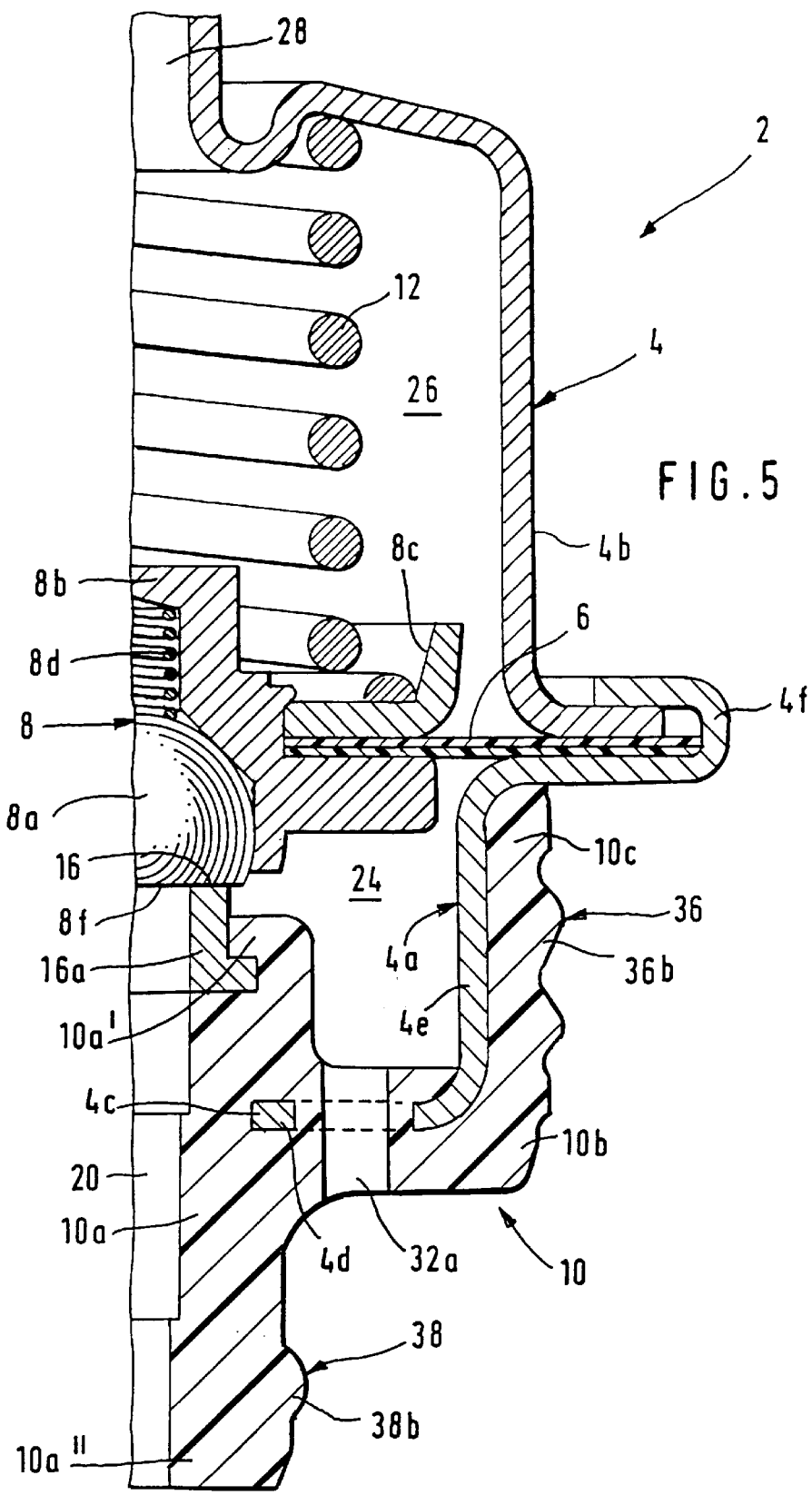
Figure 6:
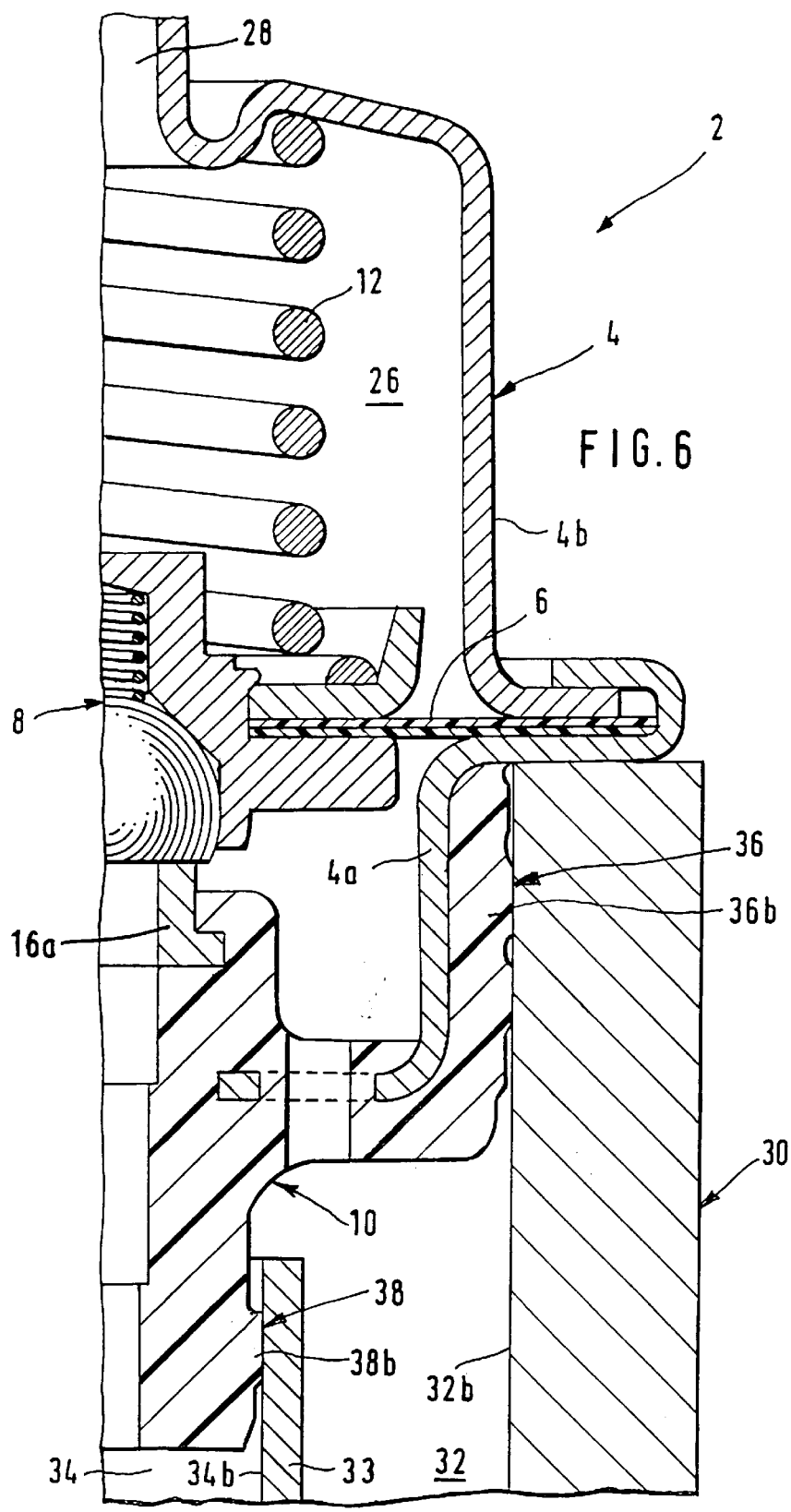

FIGS. 5 and 6 show another selected exemplary embodiment.

FIG. 5 shows the pressure regulator valve 2 before being installed in the fuel delivery system 30. FIG. 6 shows the pressure regulator valve 2 and a partial region of the fuel delivery system 30 after the installation of the pressure regulator valve 2 in the fuel delivery system 30.

A circumferential wave-shaped projection that protrudes radially outward is provided on the outer circumference of the stop piece 10, in the region of the support disk 10b and the support ring 10c. This projection is part of the housing sealing point 36 and constitutes a seal 36b that is formed onto the stop piece 10 using injection molding techniques.

In the region of the sealing point 38, on the outer diameter of the nozzle 10a of the stop piece 10, a circumferential wave-shaped projection that protrudes radially outward is formed onto the housing part 4a of the valve housing 4 by way of the injection molded stop piece 10. The projection constitutes a formed-on seal 38b.

As the exemplary embodiment according to FIG. 5 shows, another circumferential projection that constitutes an additional seal is formed in the region of the housing sealing point 36 parallel to the formed-on circumferential seal 36b. In a modification of the exemplary embodiment shown, another wave-shaped seal that protrudes radially outward and is produced using injection molding techniques can also be provided in the region of the sealing point 38 parallel to the seal 38b and/or the other circumferential projection in the region of the housing sealing point 36 can be eliminated. In both sealing points 36 and 38, more than two circumferential projections are also possible. The diameter of the formed-on seal 36b and the diameter of the seal 38b are greater than the diameter 32b or the diameter 34b of the pressure line 32 or the fuel return line 34. As a result, during or after the installation of the pressure regulator valve 2 in the fuel delivery system 30, the seal 36b and the seal 38b are elastically pressed radially inward. This state is depicted in FIG. 6. In addition to the seal 36b or the seal 38b, there are also recesses (FIG. 5). These recesses serve as volume compensation during the installation of the pressure regulator valve 2 into the fuel delivery system 30.

Depending on the manufacturing process of the fuel delivery system 30, certain measurement tolerances of the fuel delivery system 30 and in the radial direction, errors in the concentricity between the diameter 32b and the diameter 34b cannot be completely prevented. Since the stop piece 10 injection molded onto the valve housing 4 is comprised of not excessively hard, elastically resilient or plastically slightly yielding plastic, even relatively great measurement tolerances of the fuel delivery system 30 and relatively large concentricity errors of the two diameters 32b and 34b can be slightly compensated for by means of a corresponding yielding deformation of the stop piece 10 without leaks being caused between the pressure line 32 and the environment or between the pressure line 32 and the fuel return line 34. This reduces the demands with regard to tolerances to be maintained in the fuel delivery system 30 and as a result, it is easier to replace the separate sealing element 36a and the separate sealing element 38a (FIG. 1) by means of the formed-on seal 36b and 38b (FIG. 5). Furthermore, the forming-on of the seal 36b and/or the seal 38b significantly reduces the number of individual parts to be assembled in the assembly of the pressure regulator valve 2.

As FIG. 5 shows, in the region of the inner side 10a' of the nozzle 10a oriented toward the closing body 8, a valve seat insert 16a is connected to the nozzle 10a of the stop piece 10. The valve seat insert 16a takes the form, for example, of a step-shaped ring. The valve seat insert 16a can be cast or injection molded into the stop piece 10 during the manufacture of the stop piece 10 using casting or injection molding techniques. The valve seat insert 16a is comprised, for example, of metal, plastic, or rubber and is matched in its hardness to the ball part 8a of the closing body 8 so that a favorable seal and a favorable durability of the valve seat 16 and the ball part 8a is produced.

As FIG. 5 shows, the diameter of the fuel inlet 32a is smaller than the opening provided in the intermediary region 4d of the housing part 4a so that the stop piece 10 in and of itself is sufficiently connected and can be simply produced using casting or injection molding techniques.

Figure 7:
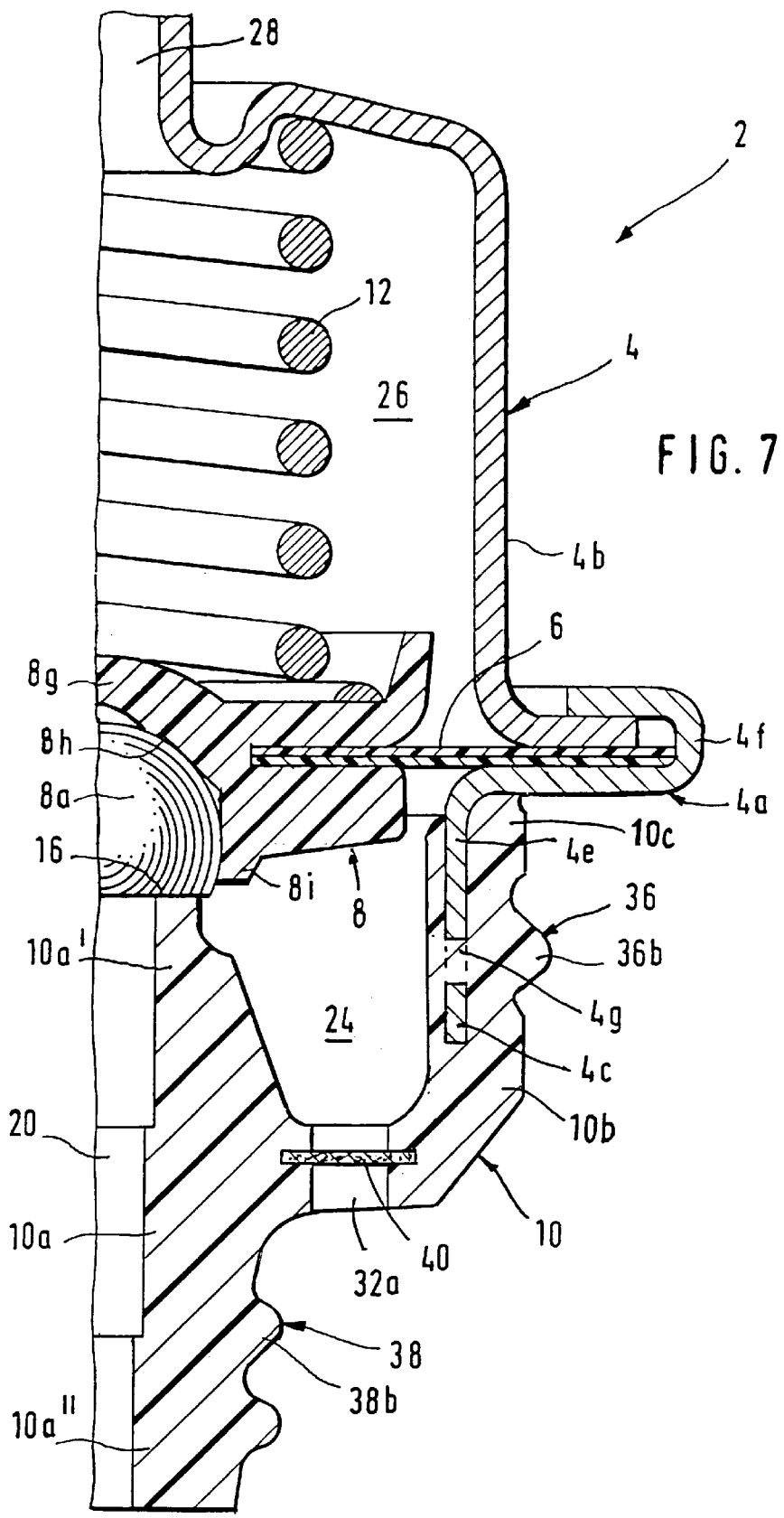

FIG. 7 shows another preferably selected exemplary embodiment.

As FIG. 7 shows, the stop piece 10 can be cast or injection molded onto the housing part 4a as a connected component so that the housing part 4a itself can be kept relatively small. As a result, the housing part 4a can be easily manufactured and few shaping procedures are required for manufacturing the housing part 4a.

To improve the hold between the housing part 4a and the stop piece 10, the bore 4g is provided in the lower housing part 4a. The injection molded stop piece 10 engages the bore 4g by passing through it.

Since the ball part 8a is resiliently secured in the ball receptacle 8h by the shaped part 8g due to the elasticity of the rim 8i, the spring 8d shown in FIG. 4 can be eliminated, as shown in FIG. 7. This results in a further reduction of the required components.

As FIG. 7 in particular shows, the stop piece 10 can be cast or injection molded onto the housing part 4a in a materially connected fashion. It is also possible, though, to injection mold the support ring 10c, for example, separately onto the housing part 4a, independently of the other regions of the stop piece 10 (FIG. 3). On the other hand, there is also the possibility of injection molding the nozzle 10a, the support disk 10b, and the support ring 10c separately onto the housing part 4a, independently of one another (FIG. 1). It should additionally be mentioned that it is also possible to injection mold for example only the nozzle 10a onto the housing part 4a and to connect the support disk 10b and the support ring 10c to the valve housing 4 in assembly fashion as separately produced components. In addition, there is the further possibility of injection molding only the support ring 10c, for example, onto the housing part 4a and connecting the support disk 10b and the nozzle 10a to the valve housing 4 in assembly fashion as separately produced components. As another possibility, it should be emphasized that also, for example, only the support disk 10b can be injection molded onto the housing part 4a and the nozzle 10a and the support ring 10c are connected to the valve housing 4 in an assembly fashion as separately produced components.

It should be emphasized that the pressure regulator valve also offers considerable advantages in comparison to the known prior art, when not the stop piece 10, but only the closing body 8 is connected as a plastic part to the membrane 6 using casting or injection molding techniques. This also obtains an essential simplification in the assembly expenditure of the pressure regulator valve 2.

Figure 8:
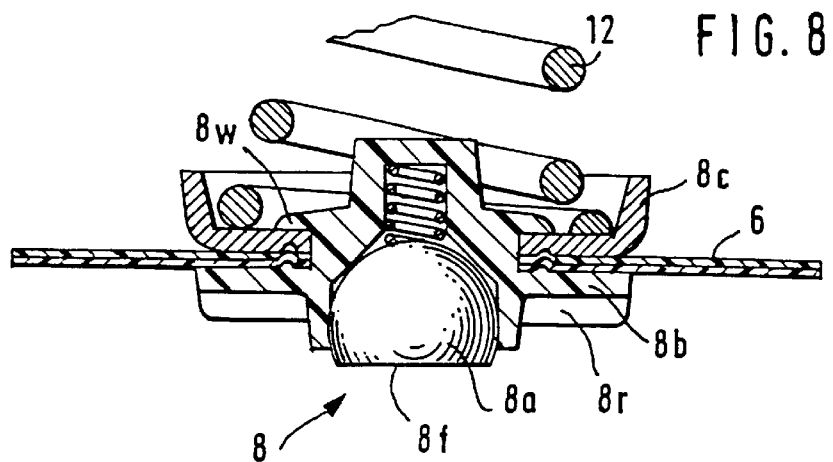

FIG. 8 shows a detail from another preferably selected exemplary embodiment.

An improvement in comparison to the previously known pressure regulator valves is also produced when, as is shown in FIG. 8, the spring plate 8c is made of metal and the securing element 8b of the closing body 8 is manufactured as an injection molded shaped part made of plastic. The membrane 6 and the spring plate 8c have internal bores and the securing element 8b has a shoulder. After the assembly of the membrane 6, the securing element 8b, and the spring plate 8c, i.e. after the shoulder of the securing element 8b has been slid into the inner bores of the membrane 6 and the spring plate 8c, the shoulder of the securing element 8b protruding through is deformed by hot crimping so that a bead 8w is produced on the securing element 8b, which produces a fixed connection between the membrane 6, the securing element 8b, and the spring plate 8c.

Forming a radially extending reinforcing rib 8r or a number of reinforcing ribs 8r onto the securing element 8b can improve the strength of the closing body 8 while using a small amount of material. The at least one reinforcing rib 8r is provided on the securing element 8b on the end face remote from the membrane 6.

Figure 9:
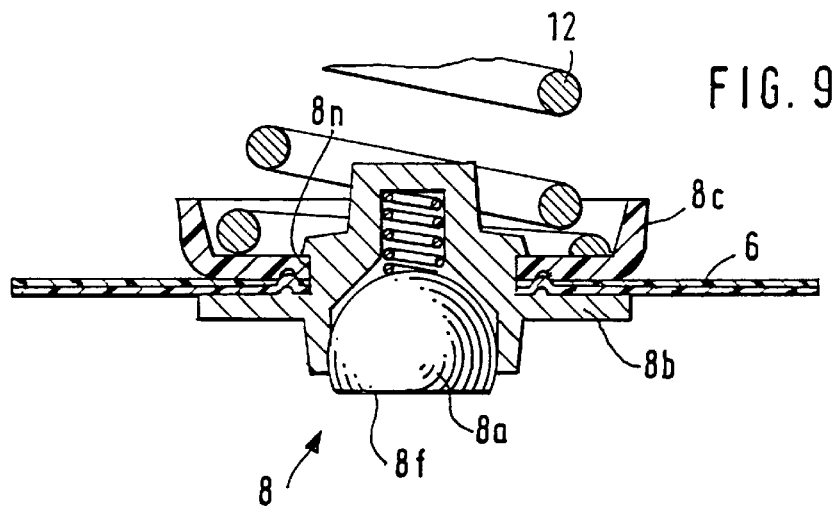

FIG. 9 shows a detail of another preferably selected exemplary embodiment.

In the exemplary embodiment shown in FIG. 9, the securing element 8b is comprised of metal and the spring plate 8c is made of plastic.

As shown in FIG. 9, a circumferential groove 8n is provided on the securing element 8b. The spring plate 8c can engage in detent fashion in the groove 8n. This produces a fixed connection between the spring plate 8c and the securing element 8b. The detent engagement of the spring plate 8c in the groove 8n is made possible because the spring plate 8c is comprised of a slightly flexible plastic. After the detent engagement of the spring plate 8c in the circumferential groove 8n, the inner diameter of the membrane 6 is firmly clamped between the securing element 8b and the spring plate 8c.

Figure 10:
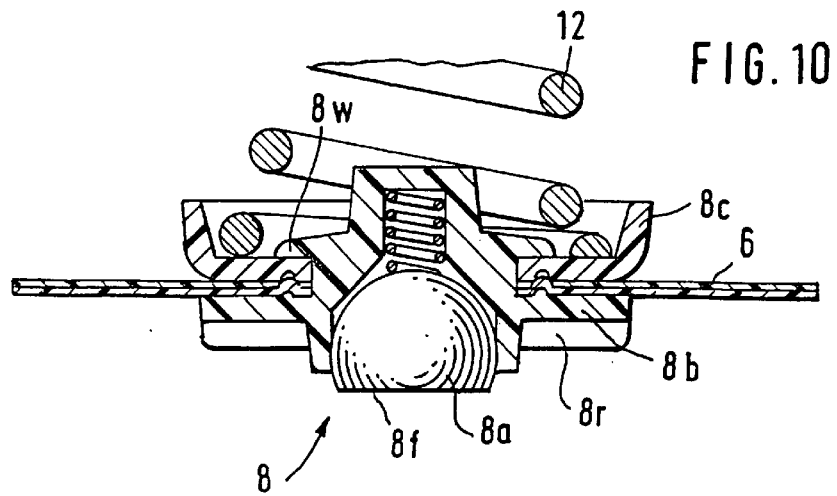

FIG. 10 shows another modification of the pressure regulator valve 2 according to the invention.

In the exemplary embodiment in FIG. 10, the securing element 8b and the spring plate 8c are comprised of plastic, wherein the securing element 8b and the spring plate 8c are connected as explained by way of example in conjunction with FIG. 8.

The foregoing relates to preferred exemplary embodiments of the invention, it being understood that other variants and embodiments thereof are possible within the spirit and scope of the invention, the latter being defined by the appended claims.

We claim:

1. A pressure regulator valve for installation in a fuel delivery system of an internal combustion engine, comprising a valve housing that encloses a fuel chamber and includes at least one housing part, with a fuel inlet provided for delivering fuel into the fuel chamber, a fuel return provided for draining fuel from the fuel chamber, wherein the housing part is connected to at least one stop piece that at least partially contributes to the coupling of the pressure regulator valve to the fuel delivery system, the at least one stop piece (10, 10a, 10b, 10c) is injection molded onto the at least one housing part (4, 4a), and a closing body (8) that is acted upon by a closing force (12) in the direction of a valve seat (16) is provided in the valve housing (4, 4a, 4b), wherein the valve seat (16) is provided on the injection molded stop piece (10, 10a, 16a).

2. A pressure regulator valve according to claim 1, in which the fuel return (20) is routed through the injection molded stop piece (10a).

3. A pressure regulator valve according to claim 2, in which a closing body (8) that is acted upon by a closing force (12) in the direction of a valve seat (16) is provided in the valve housing (4, 4a, 4b), wherein the valve seat (16) is provided on the housing part (4, 4a, 4c).

4. A pressure regulator valve according to claim 1, in which a housing sealing point (36, 36a, 36b) for producing a seal between the fuel inlet (32a) and the surroundings is provided on the injection molded stop piece (10, 10b, 10c).

5. A pressure regulator valve according to claim 2, in which a housing sealing point (36, 36a, 36b) for producing a seal between the fuel inlet (32a) and the surroundings is provided on the injection molded stop piece (10, 10b, 10c).

6. A pressure regulator valve according to claim 4, in which a sealing element (36a) is provided at the housing sealing point (36).

7. A pressure regulator valve according to claim 4, in which a housing seal (36b) is formed onto the stop piece (10, 10b, 10c) in the region of the housing sealing point (36, 36b).

8. A pressure regulator valve according to claim 1, in which the injection molded stop piece (10, 10a, 10b, 10c) is embodied as joined together in one piece.

9. A pressure regulator valve according to claim 1, in which a membrane (6), which divides a valve chamber (26) from the fuel chamber (24), and a closing body (8, 8b, 8c), which is connected to the membrane (6), is acted upon by a closing force (12) in the direction of a valve seat (16), and is at least partially comprised of plastic, are provided in the valve housing (4, 4a, 4b).

10. A pressure regulator valve according to claim 2, in which a membrane (6), which divides a valve chamber (26) from the fuel chamber (24), and a closing body (8, 8b, 8c), which is connected to the membrane (6), is acted upon by a closing force (12) in the direction of a valve seat (16), and is at least partially comprised of plastic, are provided in the valve housing (4, 4a, 4b).

11. A pressure regulator valve for installation in a fuel delivery system of an internal combustion engine, comprising a valve housing that encloses a fuel chamber and includes at least one housing part, with a fuel inlet provided for delivering fuel into the fuel chamber, a fuel return provided for draining fuel from the fuel chamber, wherein the housing part is connected to at least one stop piece that at least partially contributes to the coupling of the pressure regulator valve to the fuel delivery system, the at least one stop piece (10, 10a, 10b, 10c) is injection molded onto the at least one housing part (4, 4a), a closing body (8) that is acted upon by a closing force (12) in the direction of a valve seat (16) is provided in the valve housing (4, 4a, 4b), wherein the valve seat (16) is provided on the housing part (4, 4a, 4c), and the at least one housing part (4, 4a, 4b) is a shaped sheet metal part.

12. A pressure regulator valve for installation in a fuel delivery system of an internal combustion engine, comprising a valve housing that encloses a fuel chamber and includes at least one housing part, with a fuel inlet provided for delivering fuel into the fuel chamber, a fuel return provided for draining fuel from the fuel chamber, wherein the housing part is connected to at least one stop piece that at least partially contributes to the coupling of the pressure regulator valve to the fuel delivery system, the at least one stop piece (10, 10a, 10b, 10c) is injection molded onto the at least one housing part (4, 4a), and a sealing point (38, 38a, 38b) for producing a seal between the fuel inlet (32a) and the fuel return (20) is provided on the injection molded stop piece (10, 10a).

13. A pressure regulator valve according to claim 12, in which a sealing element (38a) is provided at the sealing point (38).

14. A pressure regulator valve according to claim 12, in which a seal (38b) is formed onto the stop piece (10, 10a) in the region of the sealing point (38).

15. A pressure regulator valve for installation in a fuel delivery system of an internal combustion engine, comprising a valve housing that encloses a fuel chamber and includes at least one housing part, with a fuel inlet provided for delivering fuel into the fuel chamber, a fuel return provided for draining fuel from the fuel chamber, wherein the housing part is connected to at least one stop piece that at least partially contributes to the coupling of the pressure regulator valve to the fuel delivery system, the at least one stop piece (10, 10a, 10b, 10c) is injection molded onto the at least one housing part (4, 4a), and a membrane (6), which divides a valve chamber (26) from the fuel chamber (24), and a closing body (8, 8g), which is injection molded onto the membrane (6) and is acted upon by a closing force (12) in the direction of a valve seat (16), are provided in the valve housing (4, 4a, 4b).

16. A pressure regulator valve according to claim 15, in which the injection molded closing body (8, 8g) carries a ball part (8a) that is directed toward the valve seat (16).

17. A pressure regulator valve according to claim 12, in which the fuel return (20) is routed through the injection molded stop piece (10a).

18. A pressure regulator valve according to claim 15, in which the fuel return (20) is routed through the injection molded stop piece (10a).

* * * * *